(12) United States Patent
Bernt et al.

(10) Patent No.: US 8,128,153 B2
(45) Date of Patent: Mar. 6, 2012

(54) FRONT SECTION FOR A MOTOR VEHICLE BODY

(75) Inventors: Volker Bernt, Trebur (DE); Rolf Ewert, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/830,191

(22) Filed: Jul. 2, 2010

(65) Prior Publication Data

US 2011/0001325 A1    Jan. 6, 2011

(30) Foreign Application Priority Data

Jul. 6, 2009  (DE) .......................... 10 2009 031 777

(51) Int. Cl.
*B60J 7/00* (2006.01)
(52) U.S. Cl. ......... 296/187.04; 296/187.09; 296/193.09; 293/115; 180/68.6
(58) Field of Classification Search .................. 293/115, 293/116; 296/187.09, 187.04, 193.09, 203.02, 296/193.1; 180/68.4, 68.6
See application file for complete search history.

(56) References Cited

U.S. PATENT DOCUMENTS 7,410,018 B2 *  8/2008  Satou ........................... 180/68.4

FOREIGN PATENT DOCUMENTS

DE            60213714 T2     8/2007
(Continued)

OTHER PUBLICATIONS

British Patent Office, British Search Report for British Application No. GB1010838.9, Oct. 13, 2010.

*Primary Examiner* — Joseph Pape
(74) *Attorney, Agent, or Firm* — Ingrassia Fisher & Lorenz, P.C.

(57) ABSTRACT

A front section of a motor vehicle body encompasses a bumper and bumper bracket that are designed to retreat during a collision while absorbing energy and momentum, a fresh air passage and a sealing element situated behind the bumper for modulating the throughput of the fresh air passage, which can be dragged along by the retreating bumper or bumper bracket. The sealing element has situated upstream from it a gap that allows the bumper and bumper bracket to retreat without simultaneously taking the sealing element with it.

11 Claims, 3 Drawing Sheets

FOREIGN PATENT DOCUMENTS

| | | |
|---|---|---|
| DE | 60220567 T2 | 10/2007 |
| DE | 102007052569 A1 | 5/2009 |
| JP | 58063545 A | 4/1983 |
| JP | 5170039 A | 7/1993 |

* cited by examiner

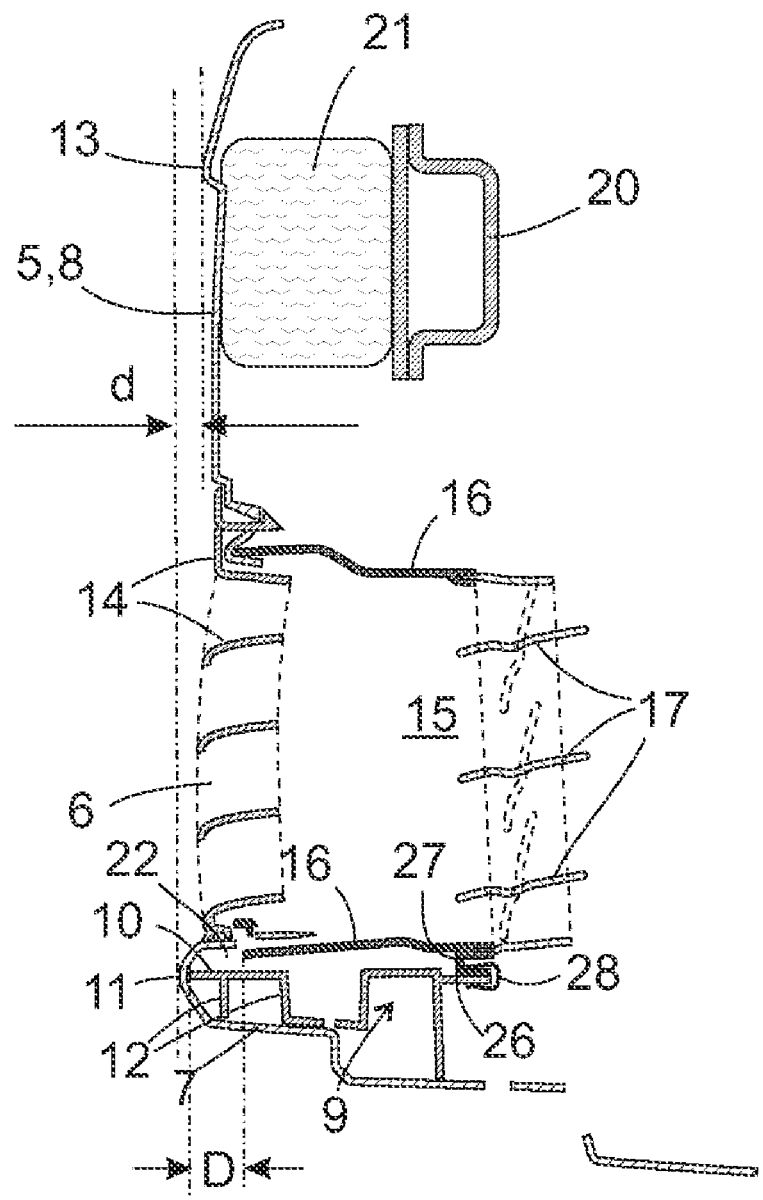

FRONT SECTION FOR A MOTOR VEHICLE BODY

CROSS-REFERENCE TO RELATED APPLICATION

This application claims priority to German Patent Application No. 102009031777.5, filed Jul. 6, 2009, which is incorporated herein by reference in its entirety.

TECHNICAL FIELD

The present invention relates to a front section of a motor vehicle body, and in particular to a configuration of such a front section that makes it possible to minimize danger to pedestrians in the event of a collision. In general, this danger becomes greater the more compact the motor vehicle design and the more tightly massive components are arranged in the front section of the body deformed by a collision and an engine compartment located behind the latter and potentially also affected by the deformation.

BACKGROUND

It has recently become increasingly common to secure a controllable sealing element, also referred to as a controllable shutter, or shutter assembly, to a fresh air passage structure in the front section of the body through which the engine is supplied with cooling and/or combustion air, making it possible to modulate the throughput of the fresh air passage structure. For example, by keeping down the throughput of air at a low engine temperature, the engine can be brought to a stationary operating temperature more quickly. This shortens the low engine temperature phase immediately after starting the engine, thus economizing on fuel and improving exhaust gas quality. Since such a sealing element must be mounted way out in front on the body, in front of the engine and in front of a radiator block upstream from the engine, it is most often already affected by deformation even given a slight collision.

Therefore, at least one object of the present invention is to provide a front section for a motor vehicle body that effectively protects pedestrians despite the presence of a sealing element that modulates the fresh air passage. In addition, other objects, desirable features, and characteristics will become apparent from the subsequent detailed description, and the appended claims, taken in conjunction with the accompanying drawings and this background.

SUMMARY

The at least one object, other objects, desirable features, and characteristics, are achieved given a front section of a motor vehicle body with a bumper and bumper bracket designed to retreat during a collision while absorbing the energy and momentum, a fresh air passage and a sealing element situated behind the front bumper for modulating the throughput of the fresh air passage that can move together with the retreating bumper or bumper bracket by means of a gap situated upstream from the sealing element into which the bumper and/or bumper bracket is able to retreat without taking the sealing element with it. As a result, a relatively slight impact initially takes place, in which only the bumper and bumper bracket are shifted in contact, and a second impact only takes place after already accelerated in a subsequent phase, which also involves the sealing element.

An area of the front section lying most to the front in vertical section that first contacts the legs of the pedestrian during a collision is preferably located under knee level to ensure that the pedestrian falls onto the hood instead of being dragged under the vehicle, leaving the knee of the pedestrian as intact as possible in the process.

An area of the front section second closest to the front that comes into contact with the pedestrian at a slightly later point is preferably situated over the fresh air passage.

The distance between the area second from the front and the area closest to the front as measured in the traveling direction should correspond at least to the width of the gap as measured in the traveling direction, so that the aforementioned second impact does not take place before the pedestrian comes into contact with the area second closest to the front.

The bumper preferably envelops the fresh air passage, and the area second closest to the front is also part of the bumper.

The sealing element can be rigidly joined with the area second closest to the front. Even if this area is part of the bumper, the mobility of the area closest to the front also formed by the bumper is not impaired, since the bumper in it can be deformed into itself The fact that the bumper bracket and sealing element can shift toward each other in the traveling direction guided by a gate further helps to stabilize the entire front section of the body. The area of the bumper closest to the front can escape unimpeded toward the back through the sealing element during a collision, until the gap has been occupied, while a greater resistance can be offered to lateral forces of the kind that arise to a significant extent given a collision between two vehicles.

Such a gate guidance can best be realized for the bumper bracket and sealing element by providing one with a back-cut groove oriented in the longitudinal direction of the vehicle, and the other with a slider that positively engages back cuts in the groove. In this way, the mobility of the bumper bracket and sealing element relative to each other can be limited as needed both in the vertical and in the transverse direction of the motor vehicle to a clearance between the groove and slider engaging the latter.

The bumper bracket and sealing element can expediently be held together by a clamp secured to both. Under normal operating conditions, the latter immovably holds the sealing element on the bumper bracket, but can detach during a collision, so that the sealing element need not retreat together with the bumper bracket during a collision from the very outset, but rather only once the upstream gap has been ripped open.

In order for the spring to automatically release during a collision, it is best detachable from the bumper bracket and/or sealing element in the longitudinal direction of the vehicle.

BRIEF DESCRIPTION OF THE DRAWINGS

The present invention will hereinafter be described in conjunction with the following drawing figures, wherein like numerals denote like elements, and:

FIG. 5 is a section similar to FIG. 2 according to a third embodiment of the invention.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
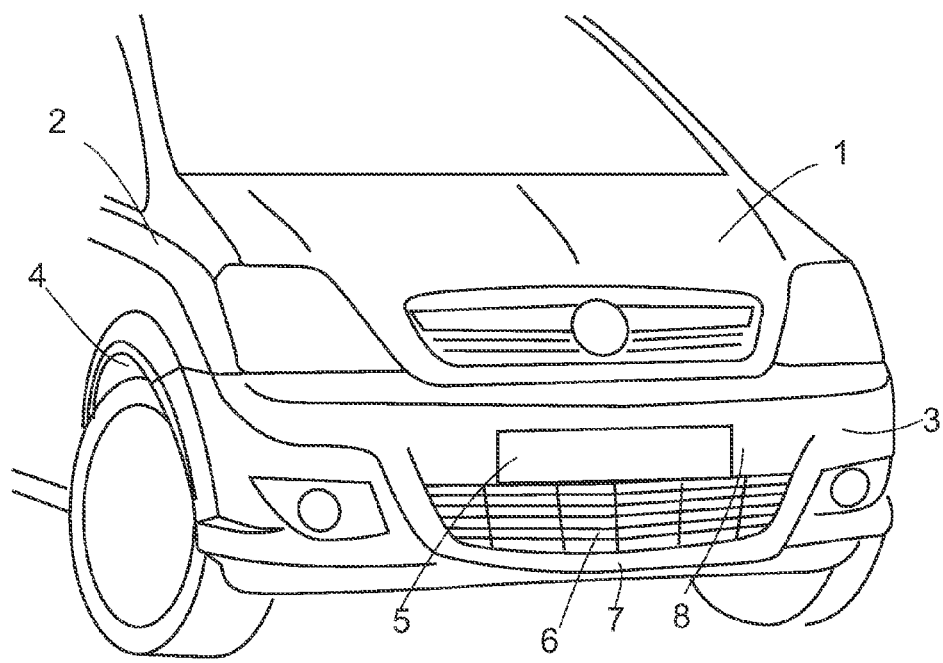
FIG. 1 is a diagrammatic, perspective view of a front section of a motor vehicle body.

FIG. 1 shows a front portion of a motor vehicle, for which the present invention can be used. The visible parts of the front portion essentially consist of a front or engine hood 1, fenders 2 and a flexible, shell-shaped bumper 3 molded out of plastic, which forms roughly the lower half of the front portion, up to and including a front part of wheel wells 4. An inlet opening 6 for cooling and combustion air is fashioned in the bumper 3 below a license plate box 5. A lower cross bracket 7 below the inlet opening 6 forms the area of the bumper 3 projecting the most toward the front and the entire front portion; an upper cross bracket 8 carrying the license plate box 5 is slightly recessed by comparison.

Figure 2:
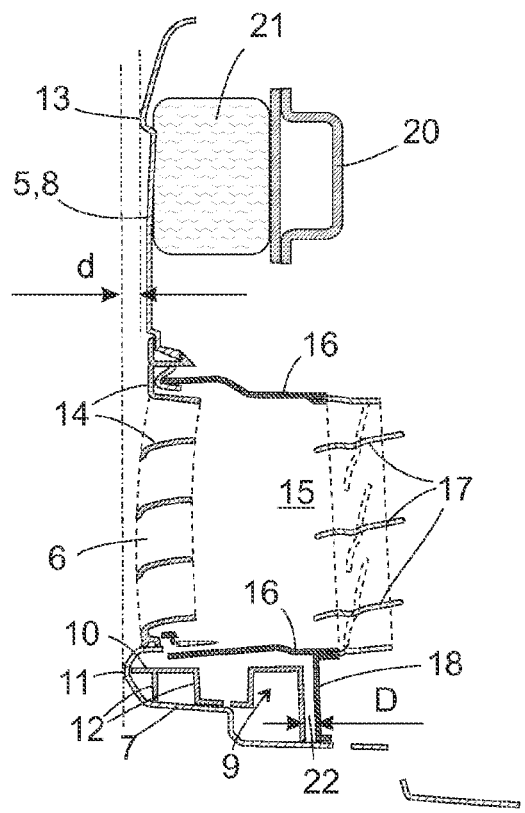
FIG. 2 is a diagrammatic, partial view through the front section.

FIG. 2 shows a diagrammatic, vertical section through the bumper 3 and its environment in the longitudinal direction of the vehicle. The lower cross bracket 7 is reinforced by a lower bumper bracket 9 made of injection molded plastic, which is supported in a known manner not depicted here by means of backwardly directed arms in supporting sections of the body, such as longitudinal brackets or an auxiliary frame. A front area of the lower bumper bracket 9 is shaped like an essentially horizontal plate 10, the front edge of which supports the lower bumper bracket 9 directly in back of its point 11 that projects the furthest toward the front. The plate 10 can be reinforced in a suitable way by molded on ribs 12. The point 13 of the upper cross bracket 8 furthest toward the front is recessed by a distance d of a few centimeters relative to the point 11 of the lower cross bracket 7 furthest toward the front.

Situated behind a ventilation louver 14 latched into the inlet opening 6 of the bumper 3 is a shutter assembly 15. The shutter assembly 15 encompasses a frame 16, including a top horizontal frame member and a bottom horizontal frame member, that inwardly shifts the edges of the inlet opening 6 and guides the incoming stream of fresh air to the engine compartment lying behind, hinged and suspended shut-off lamellae 17 adjacent to a rear wall of the frame 16, as well as a web 18 that downwardly projects from the bottom horizontal member of frame 16 and extends in the widthwise direction of the vehicle, which is situated opposite a vertical rib 19 of the lower bumper bracket 9 at a distance D at least as great as the distance d between points 11 and 13 as measured in the longitudinal direction of the vehicle. A radiator block behind the shut-off lamellae 17 is not depicted on FIG. 2.

The upper cross bracket 8 of the bumper 3 is supported in a known manner by an upper bumper bracket 20, for example made of a steel profile, via a layer 21 of an absorber material that compresses in the event of a collision, for example a rigid foam.

Given a collision with a pedestrian, the front point 11 of the lower cross bracket 7 initially comes into contact with the shin of the pedestrian, and begins to accelerate the latter forward, even before contact is made between the thigh of the pedestrian and the upper cross bracket 8 at point 13. Since the shutter 15 is not rigidly connected with the lower cross bracket 7 or the lower bumper bracket 9 in the longitudinal direction of the vehicle, the contact initially only downwardly deflects the lower cross bracket 7 and its carrier, but not the shutter 15. As a result, the mass of the deflected parts is low, causing the momentum to be transferred from the vehicle to the shin of the pedestrian at a relatively low rate of acceleration. This can be reproduced by way of a comparison with the known principles behind an elastic thrust: If a moving, heavy body hits a light body at rest, momentum and energy conservation cause the light body to fly away from the heavy body at a higher velocity than the original velocity of the heavy body; however, if a light body impacts a heavy body, the latter is only slightly accelerated, while the light body rebounds. While the collision examined here is not elastic, the extent of the acceleration, and hence the potential danger, can be minimized in this case if the components of the vehicle involved in the initial moment of the collision are lightweight. This is achieved by initially keeping the shutter 15 out of the collision, and only allowing it to come into play when the gap 22 between the web 18 and rib 19 has been closed by the collision. This time can coincide with the initial contact between the thigh and upper cross bracket 8, or even be slightly later.

Figure 3:
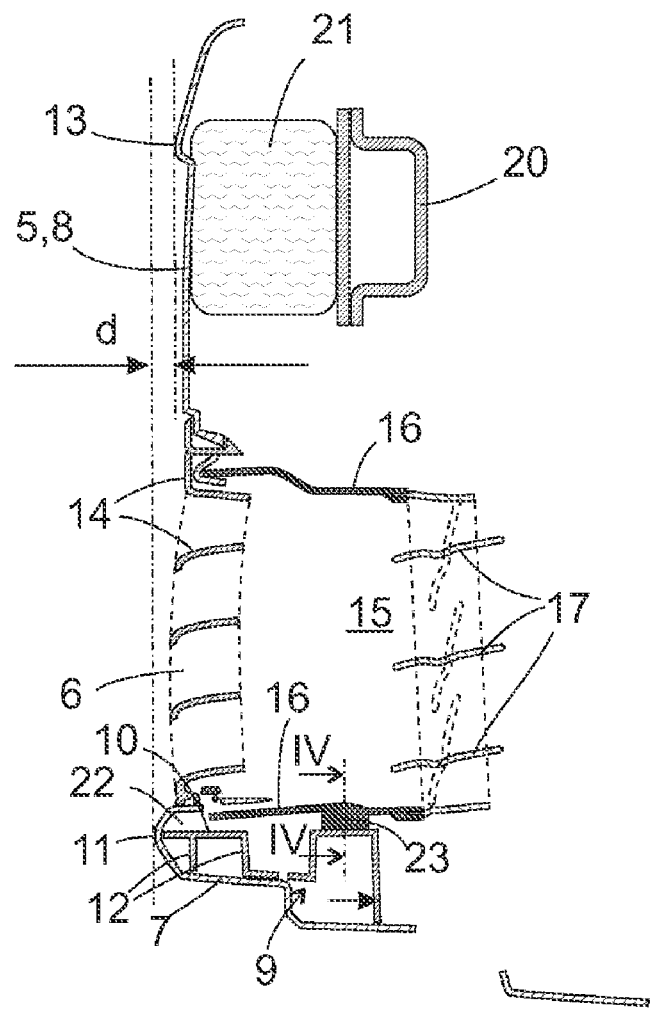
FIG. 3 is a section similar to FIG. 2 through the front section of a second embodiment of the invention.

FIG. 3 shows a partial diagrammatic section similar to FIG. 2 through the front section of a motor vehicle body according to a second embodiment of the invention. Components in this embodiment that correspond to those already described with reference to FIG. 2 are labeled with the same reference numbers, and will not be defined again. The embodiment on FIG. 3 differs from the one on FIG. 2 by the absence of the web 18 that supports the shutter 15 against the lower cross bracket 7. Therefore, the lower bumper bracket 9 could in principle retreat as desired given a collision, without ever hitting the shutter 15 and dragging along the latter. For this reason, a gap 22 defining how far the lower cross bracket 7 and lower bumper bracket 9 can jointly retreat without taking the shutter 15 with them is in this embodiment located between a front edge of a lower leg of the frame 16 and the front point 11 of the lower cross bracket 7.

Figure 4:
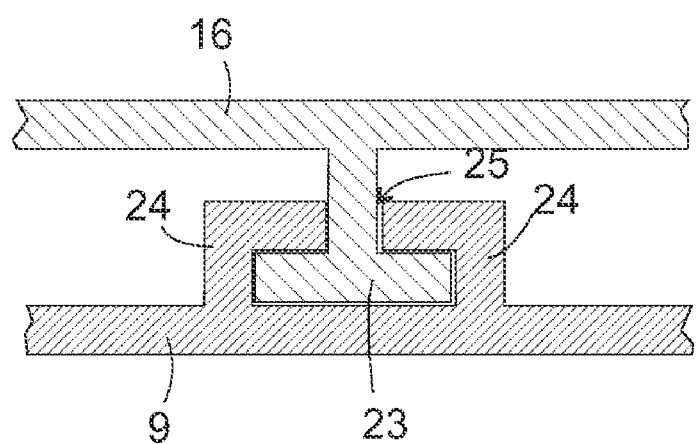
FIG. 4 is a section along the plane marked IV-IV on FIG. 3.

The sectional plane on FIG. 3 extends in the longitudinal direction through a slider 23, which supports the shutter 15 against an upper side of the lower bumper bracket 9. As shown on FIG. 4, the slider 23 resembles an upside down T in cross section, and on the upper side of the lower bumper bracket 9 engages into a groove 25 bordered on either side by projections 24 with an L-shaped cross section. While the engaging slider 23 supports the weight of the shutter 15 on the bumper bracket 9, the bumper bracket 9 initially remains movable in the longitudinal direction of the vehicle during a collision, without taking the shutter 15 with it. Only once a front edge of the frame 16 hits the bumper 3 from inside at the height of point 11 does the shutter 15 begin to retreat along with the bumper 3 and bumper bracket 9.

FIG. 5 shows another partial cross section through a front section of a motor vehicle body according to the present invention. The elements described with reference to FIG. 2 are again marked with the same reference numbers as used there, and will not be described again. A backwardly projecting web 26 is molded onto a rear side of the lower bumper bracket 9. This web 26 carries a web 27 that is joined as a single piece with the frame 16 of the shutter 15. The free edges of both webs 26, 27 face toward the back relative to the longitudinal direction of the vehicle. Secured to these free edges is an elastic clamp 28, here in the form of a profile with a roughly shaped cross section made of spring steel, pressing the two webs 26, 27 together, thereby immovably fixing the shutter 15 to the bumper bracket 9 under normal conditions. If the bumper bracket 9 is compressed in the event of a collision, the web 26 takes the chamber 28 with it. The clamping power of the clamp 28 is tuned to the inertia of the shutter 15 in such a way that, given such a collision, the shutter 15 initially does not follow the retreating bumper bracket 9, and the clamp 28 instead slips off the web 27. As in the embodiment on FIG. 3, the shutter 15 only begins to retreat with the bumper 3 and its bracket 9 when the gap 22 between the front edge of the frame 16 and the lower cross bracket 7 of the bumper 3 has been torn open, and the front edge of the frame 16 hits the interior side of the bumper 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A front section of a body of a motor vehicle, comprising:
   a bumper having an upper cross bracket and a lower cross bracket, said lower cross bracket having a front-most point disposed forwardly of said upper cross bracket, said bumper being adapted to retreat rearwardly during a frontal collision while absorbing energy and momentum; and
   a fresh air passage structure having a top horizontal frame member, a bottom horizontal frame member, and a shutter assembly connected therebetween, said shutter assembly being situated behind said bumper, said shutter assembly being adapted to modulate a throughput of air through the fresh air passage structure and thereafter to a motor, the shutter assembly being situated upstream of said motor;
   wherein said upper cross bracket is above said shutter assembly, and said lower cross bracket is below said shutter assembly;
   wherein said bumper and said shutter define a longitudinal gap that allows said bumper to retreat rearwardly during a first part of a frontal collision without causing said shutter assembly to simultaneously retreat with said bumper; and
   wherein said bumper is configured to contact said fresh air structure during a second part of a collision to close said longitudinal gap and thereby cause said shutter assembly to retreat along with said bumper when said gap is closed.

2. The front section according to claim 1, wherein said bumper is adapted to envelop an area of said front section lying furthest toward a front in a vertical section.

3. The front section according to claim 2, wherein said lower cross bracket is arranged under a knee level of a pedestrian.

4. The front section according to claim 1, wherein said upper cross bracket is disposed rearwardly of said front-most point and is arranged over said fresh air passage structure.

5. The front section according to claim 4, wherein a distance measured in a traveling direction between said front-most point and a second front-most point on said lower cross bracket is not greater than said gap as measured in the traveling direction of said vehicle.

6. The front section according to claim 5, wherein said bumper is adapted to envelop said fresh air passage structure.

7. The front section according to claim 5, wherein said shutter assembly is rigidly connected to said upper cross bracket.

8. The front section according to claim 1, wherein the bumper bracket and the sealing element can shift toward each other in a longitudinal direction of the motor vehicle guided by a gate.

9. The front section according to claim 8, wherein, for the bumper bracket and the sealing element, one encompasses a back-cut groove oriented in the longitudinal direction of the motor vehicle, and the other a slider that positively engages back cuts in a groove.

10. The front section according to claim 1, wherein the bumper bracket and the sealing element are held together by a clamp.

11. The front section according to claim 10, wherein the clamp can be detached from the bumper bracket or the sealing element in a longitudinal direction of the motor vehicle.

* * * * *